May 10, 1932.  A. J. ROBERTS  1,858,112
BRAKE FOR AIRPLANES
Filed July 19, 1930   3 Sheets-Sheet 1
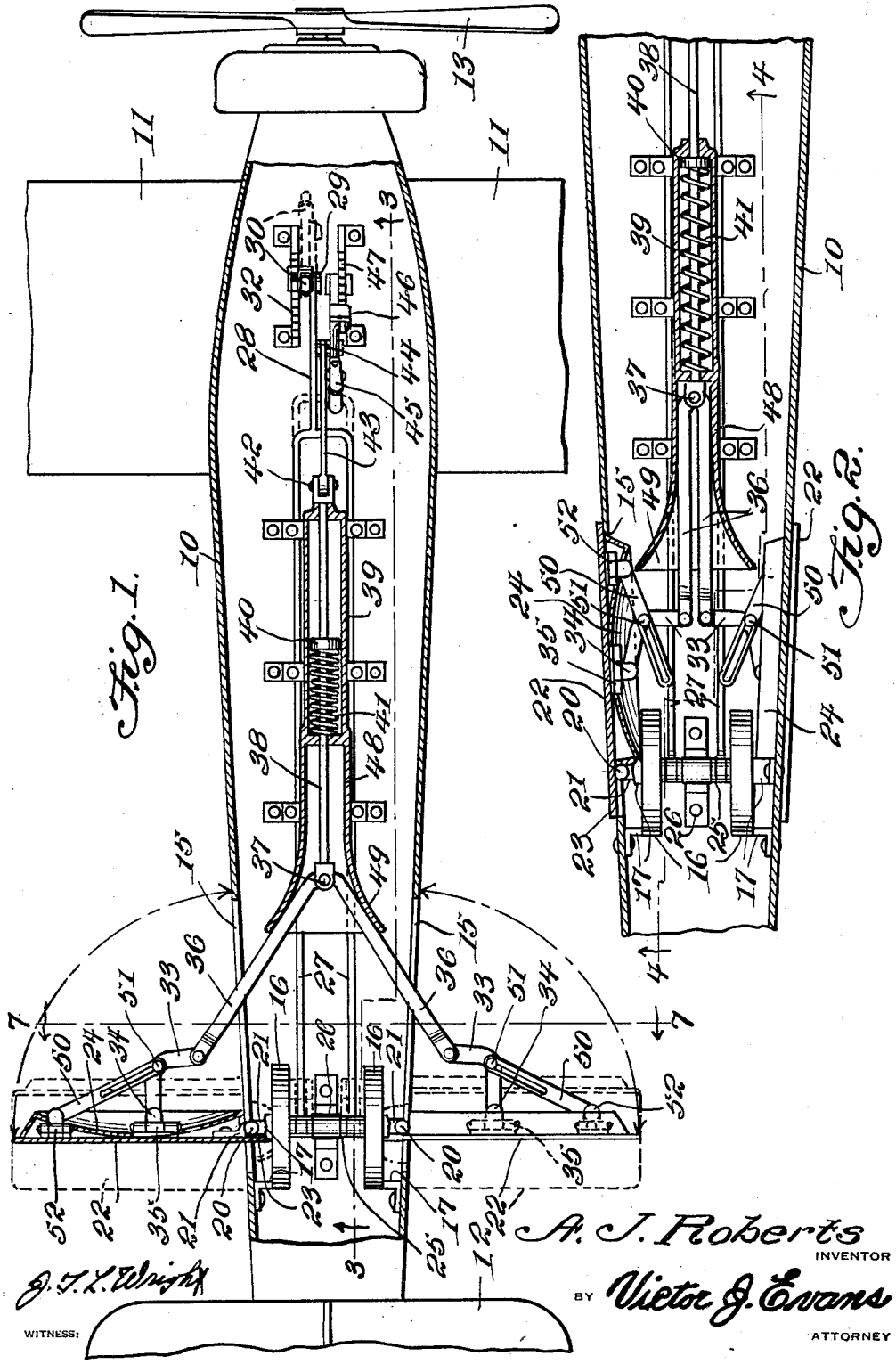
A. J. Roberts
INVENTOR
BY Victor J. Evans
ATTORNEY

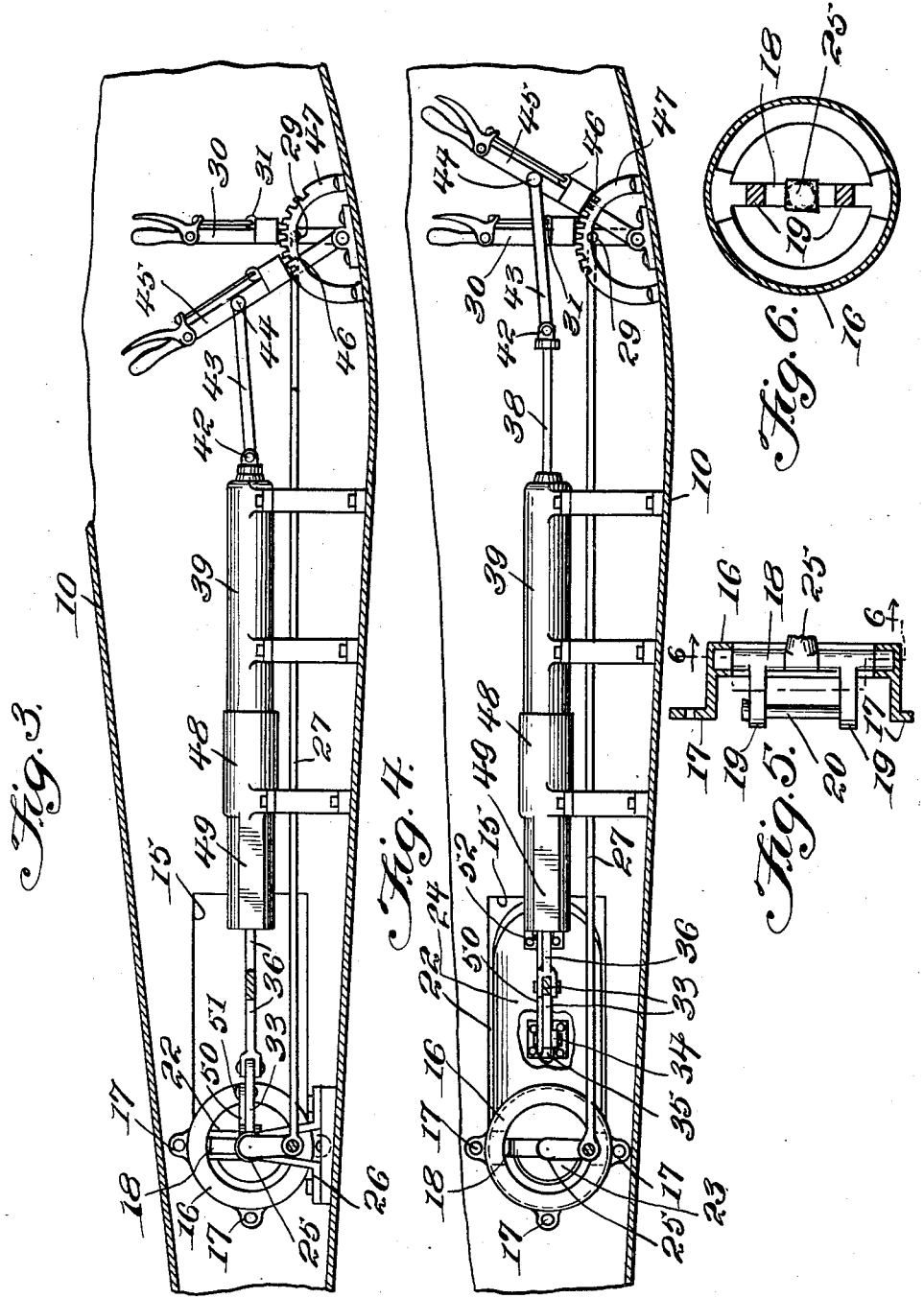

May 10, 1932. A. J. ROBERTS 1,858,112
BRAKE FOR AIRPLANES
Filed July 19, 1930  3 Sheets-Sheet 3
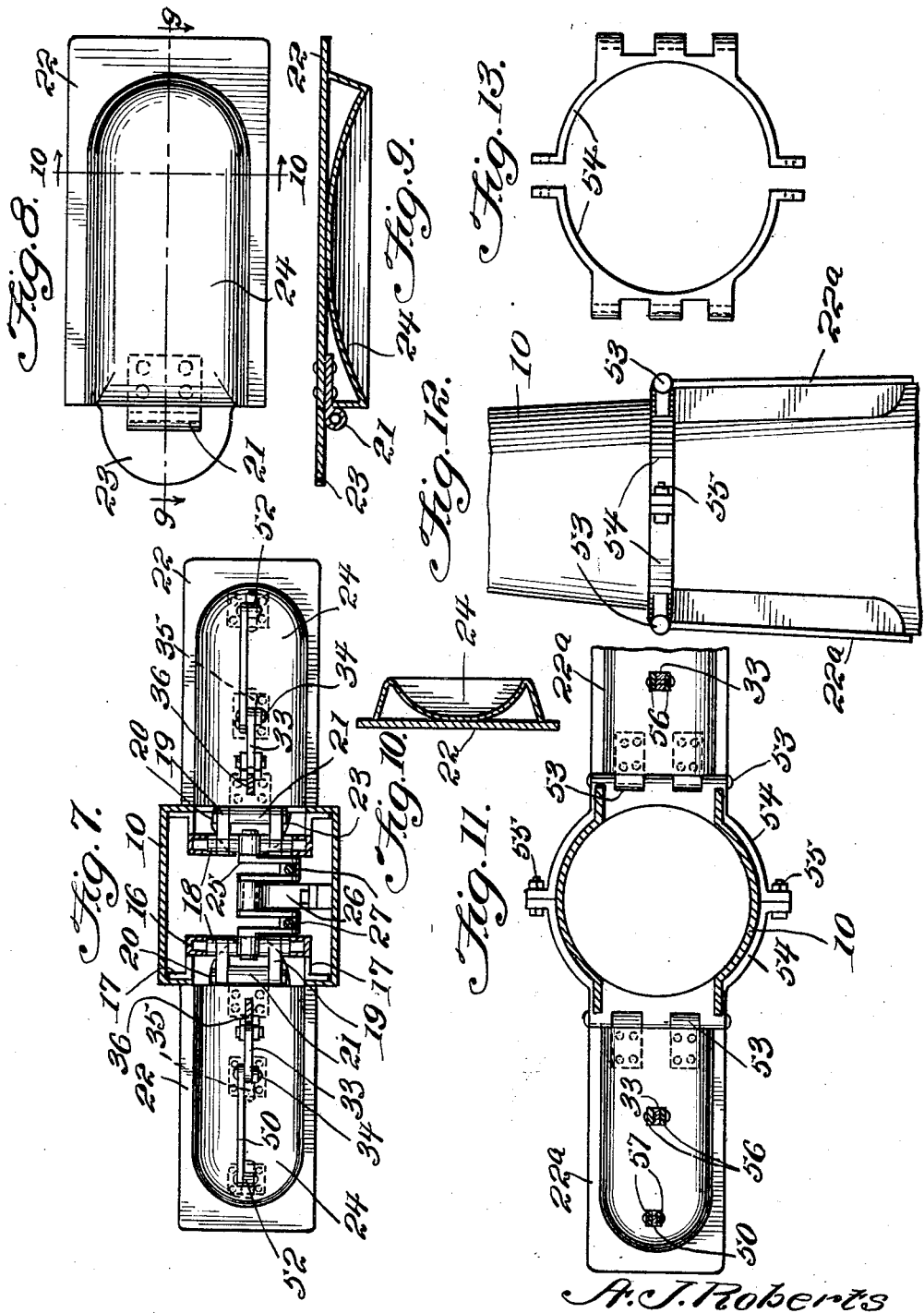

Patented May 10, 1932

1,858,112

UNITED STATES PATENT OFFICE

ALBERT J. ROBERTS, OF CLEVELAND, OHIO, ASSIGNOR OF SEVENTEEN PER CENT TO I. R. WHAN, OF CLEVELAND, OHIO

BRAKE FOR AIRPLANES

Application filed July 19, 1930. Serial No. 469,161.

This invention relates to improvements in airplanes and has for an object the provision of means capable of being adjusted to assist in "taking off" and in landing, as well as to aid in the prevention of tail spin and nose dive.

Another object of the invention is the provision of means of the above character which are simple in construction, efficient and reliable in use, and which may be installed during the construction of the fuselage of the airplane, or subsequent to its completion.

With the above and other objects in view, the invention further includes the following novel features and details of construction, to be hereinafter more fully described, illustrated in the accompanying drawings and pointed out in the appended claims.

In the drawings:—

Figure 1 is a horizontal sectional view taken longitudinally of the fuselage of an airplane with the invention installed and in position for use.

Figure 2 is a fragmentary longitudinal sectional view showing the wings in an inactive position.

Figure 3 is a vertical longitudinal sectional view through a portion of the fuselage of an airplane with the parts in the position shown in Figure 1.

Figure 4 is a like view with the parts in the position shown in Figure 2.

Figure 5 is a vertical sectional view taken transversely of the rotatable wing carrying member and its circular bearing, the wing carrying member being shown in edge elevation.

Figure 6 is a sectional view taken on the line 6—6 of Figure 5.

Figure 7 is a section on the line 7—7 of Figure 1.

Figure 8 is a face view of one of the foldable wings.

Figure 9 is a sectional view on the line 9—9 of Figure 8.

Figure 10 is a section on the line 10—10 of Figure 8.

Figure 11 is a sectional view taken transversely through the fuselage of an airplane illustrating the means for clamping the wings upon the fuselage.

Figure 12 is a fragmentary top plan view of the same with the wings in folded position.

Figure 13 is a detail view of the wing carrying clamp, the sections of which are shown separated.

Referring to the drawings in detail wherein like characters of reference denote corresponding parts, the reference character 10 indicates the fuselage of an airplane, 11 the main supporting wings, 12 the tail pieces or rudders, and 13 the propeller.

In the form of the invention shown in Figures 1 to 10, the fuselage is provided with oppositely located openings 15 in its side walls. Arranged within the fuselage adjacent these openings are circular bearing members 16. These members are located adjacent the rear ends of the openings 15 and the latter are located adjacent the tail pieces 12, the bearings 16 being rigidly held in position by means of arms or brackets 17.

Rotatable within the circular bearing members 16 are disk-like wing carrying members 18 and extending from one face of each of these members are spaced parallel arms 19.

The arms 19 provide portions of a hinge, in that they carry hinge pins 20 which pass through hinge plates 21 secured to auxiliary wings 22. These wings 22 are adapted to be extended laterally outward as shown in Figure 1 of the drawings, or to be folded inward as shown in Figure 2. As the wings have their points of hinged connection spaced slightly from the rear edges of the openings 15, extensions 23 are provided which, together with the main portions of the wings, securely close the openings 15 when the wings are in their folded position.

The outer or rear faces of the wings are flat, or are shaped to conform to the contour of the sides of the fuselage, while their opposite faces are concaved as shown at 24 so as to provide air pockets, which, when the wings are extended, are opposed to the direction of travel of the wind when the airplane is in flight. A braking effect is thus obtained which will check the speed of the airplane and materially assist in making a landing.

As the wing carrying disks 18 are axially rotatable within the bearing members 16, the wings may also be horizontally tilted as shown by the dotted lines in Figure 1 of the drawings. The wings may thus be adjusted so as to control the rear end of the airplane to assist in "taking off", and preventing tail spin and nose dive.

In order to rotate the members or disks 18 to tilt the wings, these members are connected by means of a crank shaft 25. This shaft is mounted in a bearing 26, and is provided with spaced crank arms. Rods 27 have one of their ends connected to these crank arms, while the opposite ends of the rods are connected together and to an extension 28 which is pivotally connected as shown at 29 to an operating lever 30. This lever carries a spring influenced dog 31 which engages a toothed segment 32, which acts to hold the lever 30 against movement and to hold the wings 22 in their adjusted position.

In order to fold or extend the wings, each of the wings has secured thereto one arm of a bell crank lever 33. For the purpose of attaching this lever to the wing, a double acting hinge is provided. As shown in the drawings this double acting hinge comprises a hinge 34 which is carried by the bell crank 33 and is in turn hingedly connected to the wing by means of a hinge 35. The hinge 35 is disposed at right angles with respect to the hinge 34, so that the bell crank may move horizontally when the wing is swung horizontally upon the hinge pin 20, or the wing 22 may be tilted horizontally with respect to the bell crank 33 when the wing carrying member 18 is rotated.

Pivotally secured to the outer arm of each of the bell cranks 33 is one end of an arm 36. The other ends of these arms are pivotally connected as at 37 to one end of a rod 38. This rod extends into a cylinder 39 and has rigidly secured thereto a stop collar 40 which is movable within the cylinder. A coiled spring 41 surrounds the rod 38 and bears against the collar 40 and against one end of the cylinder, so that the tension of the spring will be exerted to force the stop collar in a forward direction.

Pivotally secured to the end of the rod 38 as shown at 42 is one end of a connecting rod 43. The other end of this rod is pivotally connected as shown at 44 to an operating lever 45. This lever carries a spring influenced dog 46 which engages a toothed segment 47 so as to hold the lever 45 against accidental movement.

The cylinder 39 is provided with an extension 48 having an open flared end 49, and the arms 36 extend into this open end and engage the walls of the extension. By reference to Figures 1 and 2 of the drawings, it will be seen that when the lever 45 is moved forward from the position shown in Figure 3 to the position shown in Figure 4, the rod 39 will move forward and the arms 36 will be drawn inward. Due to the engagement of the arms 36 with the walls of the cylinder extension 48, the rear ends of these arms will be forced relatively inward, so that a forward and inward pull will be exerted upon the wings 22.

In order to prevent rearward buckling of the outer ends of the wings 22 and to assist in the closing movement of the wings, an arm 50 is provided for each wing. The inner ends of these arms have a pin and slot connection 51 with the bell cranks 33, while the outer ends of the arms 50 have a double hinge connection 52 with the outer ends of the auxiliary wings. This double hinge connection 52 is similar to the double hinge connection between the bell crank levers 33 and the wings. By reason of the pin and slot connection 51, the arms 50 will fold in a direction toward the wings when the latter are in the position shown in Figure 2 of the drawings. When the wings are extended these arms will resist any tendency of the outer ends of the wings to buckle rearwardly.

As the pivot pins of the hinges 34 are in alignment with the arms 36 and the pivotal connection between these arms and the bell cranks 33, any tendency of the wings to close from back pressure will be resisted. Closing movement is further resisted by the engagement between the operating lever 45 and the toothed segment 47.

To extend the wings, their forward ends are swung outward and if the plane is in flight, the action of the air will carry the wings to their fully extended position. However, as the wings reach their limit of outward swinging movement, the spring 41 will come into action and will yieldingly resist this movement, so that danger of injury to the wings through a sudden stop is avoided. As this action will place the spring 41 under tension, the spring will be of material assistance in overcoming the action of the wind when it is desired to fold the wings inward.

In Figures 11, 12 and 13 of the drawings, the wings 22a are hingedly secured as shown at 53 to clamping members 54. These clamping members are shaped to conform to the cross sectional shape of the rear end of the fuselage and are removably secured thereon by means of clamping bolts 55. The bell crank levers 33 are pivotally secured to the wings 22a by means of bracket arms 56, while the arms 50 are similarly secured by means of bracket arms 57. In this form of the invention, the wings may be folded inward or swung outward as previously described.

The invention is susceptible of various changes in its form, proportions and minor details of construction and the right is herein reserved to make such changes as properly fall within the scope of the appended claims.

Having described the invention what is claimed is:—

1. In combination with an airplane, wings located upon opposite sides of the fuselage adjacent the tail, a cylinder within the fuselage, means to mount the wings for horizontal swinging movement, means to swing the wings outward and project them laterally at opposite sides of the fuselage and to fold the wings inward substantially flush with said sides, said last means engaging with one end of the cylinder for exerting a forward and inward pull on said wings and means to tilt the wings horizontally.

2. In combination with an airplane, wings located upon opposite sides of the fuselage adjacent the tail, means to mount the wings for horizontal swinging movement, means to swing the wings outward and project them laterally at opposite sides of the fuselage and to fold the wings inward substantially flush with said sides, and air pockets in one face of the wings, said pockets being positioned in the direction of travel of the airplane when the wings are extended.

3. In combination with an airplane, wings located upon opposite sides of the fuselage adjacent the tail, means to mount the wings for horizontal swinging movement, bell crank levers having one of their ends pivotally secured to the wings, pivotally connected arms connecting the bell crank levers, means operatively connected with the arms to move the latter longitudinally of the fuselage and spring the wings inward or outward, and means to receive and move the arms relatively inward when the wings are swung inward.

4. In combination with an airplane, wings located upon opposite sides of the fuselage adjacent the tail, means to mount the wings for horizontal swinging movement, means to swing the wings outward and project them laterally at opposite sides of the fuselage and to fold the wings inward substantially flush with said sides, and rotatable bearing members at opposite sides of the fuselage and included in the wing mounting means.

5. In combination with an airplane, foldable wings mounted upon opposite sides of the fuselage adjacent the tail of the airplane, a bearing member mounted for rotation at opposite sides of the fuselage, hinge connections between the bearing members and wings, whereby said wings may be projected laterally outward, swung inward, and horizontally tilted; means to swing the wings inward or outward, and means to tilt the wings.

6. In combination with an airplane, foldable wings mounted upon opposite sides of the fuselage adjacent the tail of the airplane, a bearing member mounted for rotation at opposite sides of the fuselage, hinge connections between the bearing members and wings, whereby said wings may be projected laterally outward, swung inward, and horizontally tilted; means to swing the wings inward or outward, a crank shaft supporting the bearing members, and means remote from the crank shaft to operate the same and tilt the wings.

7. In combination with an airplane, wings located upon opposite sides of the fuselage adjacent the tail, means removably clamped around the body of the airplane to mount the wings for horizontal swinging movement, and means to swing the wings outward and project them laterally at opposite sides of the fuselage and to fold them inward substantially flush with said sides.

8. The combination with an airplane, wings located on opposite sides of the fuselage adjacent the tail, means to mount the wings for horizontal swinging movement, means to swing the wings outward and project them laterally at opposite sides of the fuselage and to fold the wings inward substantially flush with said sides, a cylinder within the fuselage having a flared end with which the latter-mentioned means engages for exerting a forward and inward pull on said wings.

9. The combination with an airplane, wings located upon opposite sides of the fuselage adjacent the tail, means to mount the wings for horizontal swinging movement, a cylinder within said fuselage, an operating rod movably mounted within the cylinder, a stop collar on said rod, means pivotally connected to one end of the rod for operative connection with the wings to swing the latter outward or inward when the stop collar is moved longitudinally on the rod, and means to yieldingly resist movement of the stop collar in one direction and to assist movement of the collar in the opposite direction.

In testimony whereof I affix my signature.

ALBERT J. ROBERTS.